(12) United States Patent
Boger et al.

(10) Patent No.: US 10,977,358 B2
(45) Date of Patent: Apr. 13, 2021

(54) SYSTEM AND METHOD FOR SIGNATURE PATHWAY AUTHENTICATION AND IDENTIFICATION

(71) Applicant: PASSTOUCH, LLC, Surf City, NC (US)

(72) Inventors: Jason Neal Boger, Surf City, NC (US); Alan C. Lesesky, Charlotte, NC (US); John Blanco, Littleton, CO (US)

(73) Assignee: PassTouch, LLC, Surf City, NC (US)

( * ) Notice: Subject to any disclaimer, the term of this patent is extended or adjusted under 35 U.S.C. 154(b) by 133 days.

(21) Appl. No.: 15/842,150

(22) Filed: Dec. 14, 2017

(65) Prior Publication Data

US 2018/0107836 A1    Apr. 19, 2018

Related U.S. Application Data (63) Continuation of application No. 15/417,975, filed on Jan. 27, 2017, now abandoned, which is a continuation of application No. 13/806,367, filed as application No. PCT/US2011/001147 on Jun. 27, 2011, now abandoned.

(60) Provisional application No. 61/398,443, filed on Jun. 25, 2010.

(51) Int. Cl.
  *G06F 21/36* (2013.01)
  *G06F 3/0488* (2013.01)

(52) U.S. Cl.
  CPC .......... *G06F 21/36* (2013.01); *G06F 3/04883* (2013.01); *G06F 3/04886* (2013.01)

(58) Field of Classification Search
  CPC ... G06F 21/36; G06F 3/04883; G06F 3/04886
  See application file for complete search history.

(56) References Cited

U.S. PATENT DOCUMENTS

| | | | |
|---|---|---|---|
| 7,593,000 B1* | 9/2009 | Chin | G06F 3/04883 345/156 |
| 8,024,775 B2* | 9/2011 | Xu | G06F 21/36 726/2 |
| 8,554,177 B2* | 10/2013 | Yeo | G06F 21/32 455/411 |
| 8,638,939 B1* | 1/2014 | Casey | G06F 21/36 380/277 |
| 8,904,479 B1* | 12/2014 | Johansson | G06F 21/36 726/2 |

(Continued)

OTHER PUBLICATIONS

NPL Search (Google Scholar) (Year: 2020).*

(Continued)

*Primary Examiner* — John B King
*Assistant Examiner* — Richard W Cruz-Franqui
(74) *Attorney, Agent, or Firm* — Schwartz Law Firm, P.C.

(57) ABSTRACT

A computer-implemented security system and method provides signature pathway authentication and identification. The system and method include establishing a user-defined cognitive signature pathway through multiple graphical zones of a graphical user interface. The signature pathway enables authorized user access to an otherwise secured location. Subsequent entries of the signature pathway entered via the graphical user interface are then validated. For all valid entries of the signature pathway, user access is allowed to the secured location.

11 Claims, 8 Drawing Sheets

(56) References Cited

U.S. PATENT DOCUMENTS

| | | | | |
|---|---|---|---|---|
| 2005/0253817 | A1* | 11/2005 | Rytivaara | G06F 21/36 345/173 |
| 2007/0100651 | A1* | 5/2007 | Ramer | G06Q 30/06 705/37 |
| 2008/0136587 | A1* | 6/2008 | Orr | G08C 19/00 340/5.31 |
| 2008/0235788 | A1* | 9/2008 | El Saddik | G06F 21/36 726/18 |
| 2009/0153527 | A1* | 6/2009 | Paczkowski | G06F 3/04847 345/184 |
| 2009/0195418 | A1* | 8/2009 | Oh | G06F 3/04886 341/34 |
| 2009/0313693 | A1* | 12/2009 | Rogers | G06F 21/36 726/21 |
| 2010/0053104 | A1* | 3/2010 | Ahn | G06F 3/04883 345/173 |
| 2010/0071060 | A1* | 3/2010 | Lin | G06F 21/36 726/19 |
| 2011/0071818 | A1* | 3/2011 | Jiang | G06F 3/0236 704/8 |
| 2012/0151399 | A1* | 6/2012 | Soerensen | G06F 16/26 715/769 |
| 2012/0204257 | A1* | 8/2012 | O'Connell | G06Q 20/4016 726/19 |
| 2014/0310805 | A1 | 10/2014 | Kandekar | |

OTHER PUBLICATIONS

Burns, Chris; Picture Password Revealed by Microsoft, some sort of new OS mentioned as well; www.slashgear.com/picture-password-revealed . . . ; published prior to Jun. 27, 2011.

* cited by examiner

SYSTEM AND METHOD FOR SIGNATURE PATHWAY AUTHENTICATION AND IDENTIFICATION

TECHNICAL FIELD

The present disclosure relates broadly and generally to electronic user authentication and identification; and in one or more exemplary embodiments, described herein, to a system and method for signature pathway authentication and identification via sequenced spatial cognition.

BACKGROUND

The need for secure access to electronic data, information, and systems continues to grow exponentially. The mobile device and tablet markets have seen explosive growth in recent months/years. These touch-driven devices are now capable of accessing the same private information that a desktop computer can. They can hold personal email, banking information, pass codes and pin numbers, and more. In exemplary embodiments, the present technology is a computer-driven system and method for user authentication and identification enabling authorized user access to this information and other normally "locked" data, information, and systems.

The exemplary technology may be applicable in a wide variety of markets relating to, for example, social networking, such as Facebook® and Twitter®, garage door operation, POS (Point of Sale), POS software, cabinets, drawers, closets, doors, lockers, bike security locks, narcotic boxes-security, mirror, seat, radio, television settings, memory development, memory games, drunk driving testing and memory/physical therapy, e-commerce, home automation, fuel pump operation, fast food drive-thru, banking drive-thru, gate access, medical equipment, firearms, machine operation, automotive operation-starting/entry via direct and/or wireless device input, locks, safes, battery charging operation, nuclear inspection, passport, airport security, domestic and international travel, medical records and medical equipment operation, entertainment/gaming, golf cart operation, military security, medical records, e-commerce, DNA (deoxyribonucleic), IQ testing, and biometrics, such as fingerprint, finger index ratio, finger/hand width/length/size, facial recognition, iris recognition, video recognition, voice recognition, writing analysis, muscle memory recognition, neurological development for medical purposes, children education and development, lock out of browsers for users such as children, enhancements of existing applications such as mapping, directions or games, multiple user security for co authorization/approval, genetics and hereditary purposes. Embodiments of the present disclosure may also be combined with emerging technologies such as, RFID (Radio Frequency Identification) both active and passive technologies, wireless technologies such as Wi-Fi, Wi-Max, Bluetooth, ZIGBEE, and Z-Wave.

Despite the advances of touch and multi-touch input technologies, authentication methods are still generally cumbersome and difficult to reproduce with the same degree of speed, accuracy and security that a desktop computer user is accustomed to with traditional alpha-numeric authentication schemes. In exemplary embodiments, the present technology involves muscle memory and may promote the emergence of signature analysis applications. The present disclosure may utilize microprocessors, e-squared memory, and software/firmware for analyzing weighted/value dot matrix (dots) with capacitive and resistive touchscreen technology.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a computer-implemented security method for signature pathway authentication and identification. The method comprises establishing a user-defined cognitive signature pathway through multiple graphical zones of a graphical user interface. The signature pathway enables authorized user access to an otherwise secured location. Subsequent entries of the signature pathway entered via the graphical user interface are then validated. For all valid entries of the signature pathway, user access is allowed to the secured location.

As used herein, the term "graphical zone" or "graphical zones" is defined broadly to mean any visually distinct region or regions within the GUI and defined by one or a collection of mathematical data points, or any visually distinct region or regions paired (or "synched") with a mathematical tracking grid within the GUI. Alternatively, the present system and method may utilize a user interface other than a GUI.

The term "signature pathway" is defined broadly herein to mean any assigned or user-defined sequence of inputs at predetermined graphical zones in the signature-pathway GUI, or a continuous free-flowing movement (i.e., input) in the GUI from one graphical zone to another, or a combination of continuous free-flowing and sequential "touch" inputs between graphical zones in the GUI.

The term "secured location" refers broadly herein to any electronic information site, electronic database, electronic account, Internet website, computer system, computer network, virtual and physical locking devices, and other systems, devices, and locations with security features requiring entry of codes, pin numbers, passwords, or the like for authorized user access.

According to another exemplary embodiment, establishing the user-defined signature pathway comprises inputting the signature pathway using touchscreen technology selected from a group consisting of resistive touchscreen and capacitive touchscreen.

According to another exemplary embodiment, inputting the signature pathway comprises an uninterrupted screen-engaging movement through multiple graphical zones of the graphical user interface.

According to another exemplary embodiment, the uninterrupted screen-engaging movement is performed manually using a finger of the user.

According to another exemplary embodiment, the uninterrupted screen-engaging movement is performed using an input device selected from a group consisting of a mouse, stylus, joystick, game controller, finger guard, and virtual simulated finger.

According to another exemplary embodiment, validating subsequent entries of the signature pathway comprises comparing each subsequent entry to the established signature pathway, and determining whether the subsequent entry is within a predetermined allowable variance.

According to another exemplary embodiment, the method includes adjusting the predetermined allowable variance to control the relative security of the signature pathway.

According to another exemplary embodiment, the method includes determining a location of the user prior to the user completing a subsequent entry of the signature pathway.

According to another exemplary embodiment, the user-defined signature pathway incorporates user data selected from a group consisting of finger measurements, screen pressure, and input speed.

In another exemplary embodiment, the present disclosure comprises a computer-implemented security system for signature pathway authentication and identification. The security system comprises a graphical user interface adapted for enabling user interaction with a computing device. The graphical user interface comprises a visual arrangement of multiple graphical zones defined by electronic data points. Means using the graphical user interface are provided for establishing a user-defined cognitive signature pathway through the multiple graphical zones. The signature pathway enables authorized user access to an otherwise secured location. Means are provided for validating subsequent entries of the signature pathway entered via the Graphical User Interface, whereby only valid pathway entries gain access to the secured location.

According to another exemplary embodiment, the means for establishing the user-defined signature pathway comprises an input device selected from a group consisting of a mouse, stylus, joystick, game controller, finger guard, and virtual simulated finger.

According to another exemplary embodiment, the means for validating subsequent entries of the signature pathway comprises means for comparing each subsequent entry to the established signature pathway, and determining whether the subsequent entry is within a predetermined allowable variance.

According to another exemplary embodiment, means are provided for adjusting the predetermined allowable variance to control the relative security of the signature pathway.

According to another exemplary embodiment, means are provided for determining a location of the user prior to the user completing a subsequent entry of the signature pathway.

According to another exemplary embodiment, the means for validating subsequent entries of the signature pathway comprises means for analyzing user data selected from a group consisting of finger measurements, screen pressure, input speed, and input time.

According to another exemplary embodiment, means are provided for denying entry of subsequent signature pathways after a predetermined number of successive failed entries.

In yet another exemplary embodiment, the disclosure comprises a computer program product including program instructions tangibly stored on a computer-readable medium and operable to cause a computing device to perform a method for signature pathway authentication and identification.

In still another exemplary embodiment, the disclosure comprises a computer-readable storage medium storing computer-executable instructions, executable by processing logic of a computing device, including one or more instructions, that when executed by the processing logic, cause the processing logic to perform a method for signature pathway authentication and identification.

In still another exemplary embodiment, the disclosure comprises an article of manufacture comprising a computer-readable storage medium, and executable program instructions embodied in the storage medium that when executed by processing logic of a computing device causes the processing logic to perform a method for signature pathway authentication and identification.

In still another exemplary embodiment, the disclosure comprises the tablet/phone/touch screen can be displayed as a mirror function and the user can project the graphic display on the screen. This insures that the user is identified with the authorized graphic display/pathway thus providing enhanced security.

BRIEF DESCRIPTION OF THE DRAWINGS

Exemplary embodiments of the present invention will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 5:
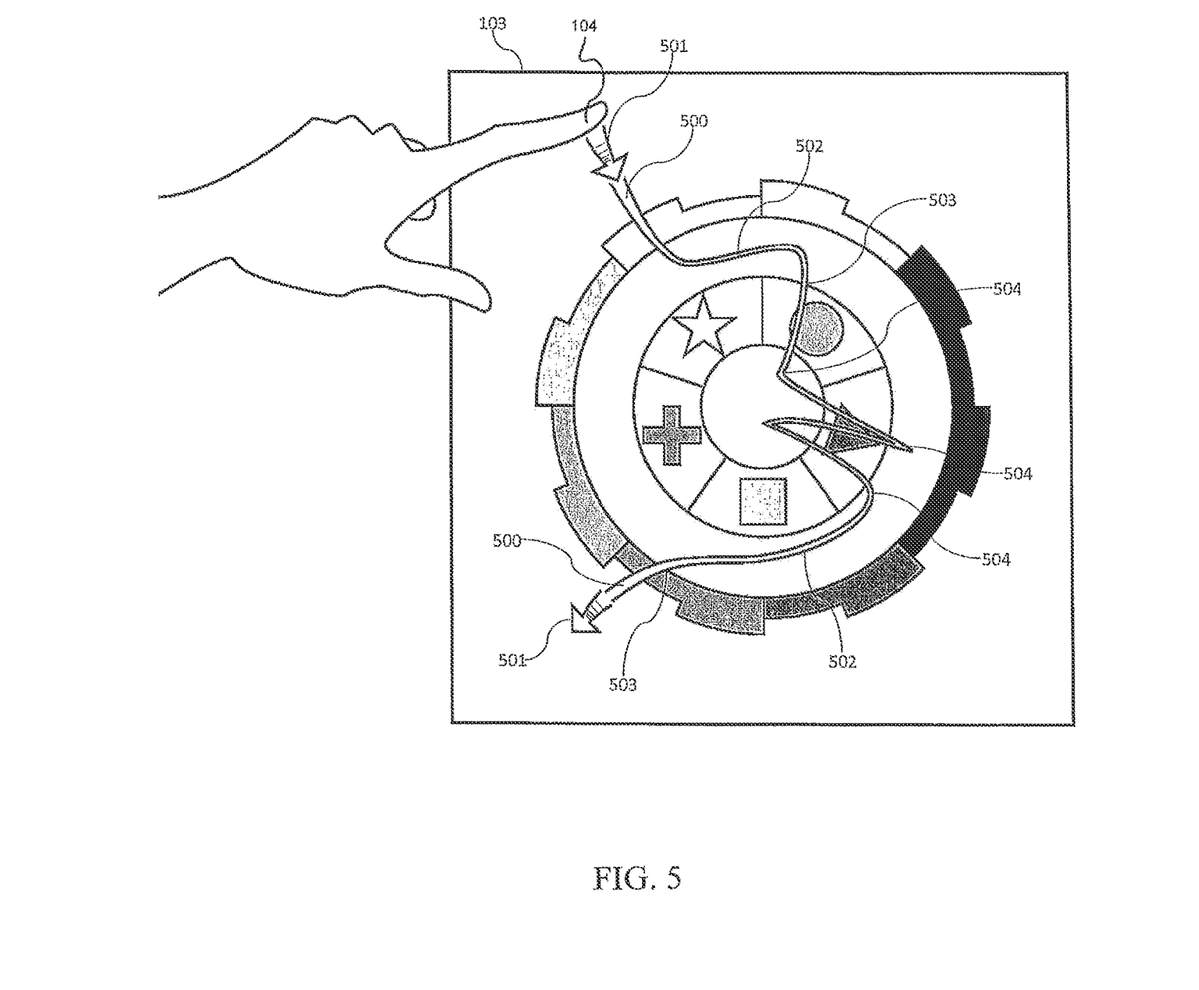
FIG. 5 illustrates one example of a Signature Pathway passcode.
Figure 6:
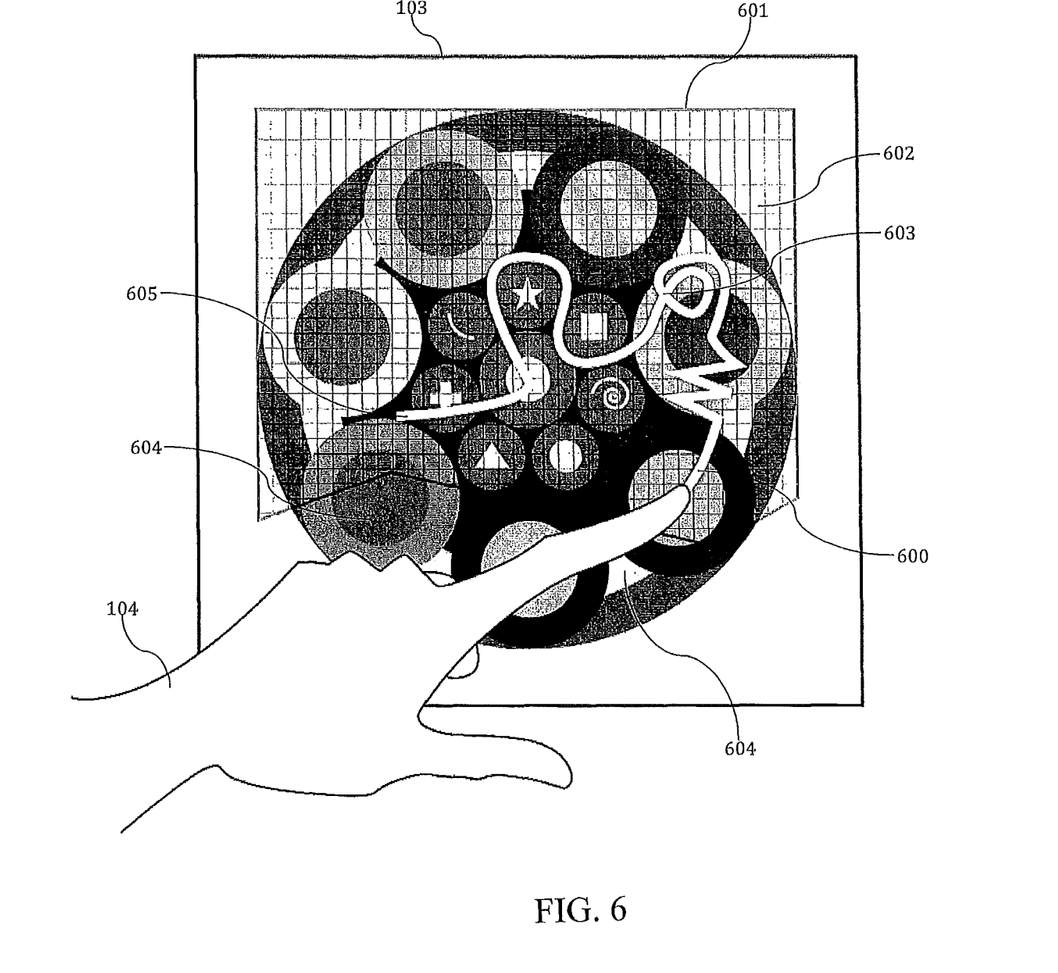
FIG. 6 illustrates an alternative example of a Signature Pathway passcode.

In exemplary embodiments, the present computer-driven security system and method utilizes the concept of cognitive Signature Pathway authentication and identification, discussed in further detail below. The "Signature Pathway" passcode is a user-defined cognitive screen touch or drag through multiple graphical zones of a Graphical User Interface. An exemplary signature-pathway Graphical User Interface is shown in FIGS. 5 and 6. Valid entry of a user's Signature Pathway passcode enables authorized access to an otherwise secured location, as defined above.

Exemplary Computer Hardware and Software

The exemplary system and method may be implemented via a computer program product (e.g., mobile app) comprising program instructions tangibly stored on a computer-readable medium, and operable to cause a computing device to perform Signature Pathway authentication and identification. The present disclosure further comprises a computer-readable storage medium storing computer-executable instructions, executable by processing logic of a computing device, including one or more instructions, that when executed by the processing logic, cause the processing logic to perform Signature Pathway authentication and identification. In yet another exemplary embodiment, the present disclosure comprises an article of manufacture including a computer-readable storage medium, and executable program instructions embodied in the storage medium that when executed by processing logic of a computing device causes the processing logic to perform Signature Pathway authentication and identification.

The computing device may incorporate or comprise any general or specific purpose machine with processing logic capable of manipulating data according to a set of program instructions. Examples of computing devices include a personal computer, laptop, netbook, e-reader, tablet computer, mobile phone, personal digital assistant, lock device, automotive control system, home security system, and others. In one exemplary embodiment, the computing device comprises a mobile tablet such as the iPAD®2 by Apple Inc using iOS 4.3.3. Current product specifications for the iPAD®2 are copied below.

Display
   9.7-inch (diagonal) LED-backlit glossy widescreen Multi-Touch display with IPS technology
   1024-by-768-pixel resolution at 132 pixels per inch (ppi)
   Fingerprint-resistant oleophobic coating
   Support for display of multiple languages and characters simultaneously iPad 2 Processor
   Apple A5 Processor
   1 GHz dual-core Apple A5 custom-designed, high-performance, low-power system-on-a-chip iPad 2 Internal Memory/Storage Capacity
   For both iPad Wi-Fi and iPad WiFi+3G:
   16 GB, 32 GB or 64 GB internal flash memory (or flash drive)

Wireless
   Wi-Fi (802.11a/b/g/n)
   Bluetooth 2.1+EDR technology The exemplary tablet includes card slots for removable flash and SIM cards, and may have up to 32 GB of non-volatile internal memory. One or more of the flash and SIM cards and internal memory may comprise computer-readable storage media containing program instructions applicable for effecting the present system and method for Signature Pathway authentication and identification, described further below. As generally known and understood in the art, the flash card is an electronic flash memory data storage device used for storing digital information. The card is small, re-recordable, and able to retain data without power. For example, Secure Digital (SD) is a non-volatile memory card format developed by the SD Card Association for use in portable devices. SD has an official maximum capacity of 2 GB, though some are available up to 4 GB.

The SIM card contains an integrated circuit that securely stores the service-subscriber key (IMSI) used to identify a subscriber on mobile devices including the exemplary tablet. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Secure data or application storage in a memory card or other device may be provided by a Secure Element (SE). The SE can be embedded in the logic circuitry of the tablet (or other mobile device), can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

Additionally, to identify a user's tablet (or other mobile device), a unique serial number called International Mobile Equipment Identity, IMEI, may be assigned to the device. As known by persons skilled in the art, IMEI is standardized by ETSI and 3GPP, and mobile devices which do not follow these standards may not have an IMEI. The IMEI number is used by the network to identify valid mobile devices. IMEI identifies the device, not the user (the user is identified by an International Mobile Subscriber Identity, IMSI), by a 15-digit number and includes information about the source of the mobile device, the model, and serial number.

Other features of the exemplary tablet may include front-facing and rear-facing cameras, Dolby Digital 5.1 surround sound, video mirroring and video out support, built-in speaker and microphone, built-in 25-watt-hour rechargeable lithium-polymer battery, and sensors including three-axis gyro, accelerometer, and ambient light sensor.

The exemplary tablet may also combine A-GPS and other location services including Wi-Fi Positioning System and cell-site triangulation, or hybrid positioning system. Mobile phone tracking tracks the current position of a mobile phone, even when it is moving. To locate the phone, it must emit at least the roaming signal to contact the next nearby antenna tower, but the process does not require an active call. GSM localisation is then done by multilateration based on the signal strength to nearby antenna masts. Mobile positioning, which includes location based service that discloses the actual coordinates of a mobile phone bearer, is a technology used by telecommunication companies to approximate where a mobile phone, and thereby also its user (bearer), temporarily resides.

The exemplary tablet may incorporate a capacitive touchscreen. As generally know and understood in the art, capacitive touchscreens tend to be more accurate and responsive than resistive screens. Because they require a conductive material, such as a finger tip, for input, they are not common among (stylus using) Tablet PCs but are more prominent on the smaller scale tablet computer devices for ease of use, which generally do not use a stylus, and need multi-touch capabilities. In alternative embodiments, the tablet may comprise a resistive touchscreen. Resistive touchscreens are passive and can respond to any kind of pressure on the screen. They allow a high level of precision (which may be needed, when the touch screen tries to emulate a mouse for precision pointing, which in Tablet personal computers is common). Because of the high resolution of detection, a stylus or fingernail is often used for resistive screens. The exemplary touchscreen technology may also include palm recognition, multi-touch capabilities, pressure sensitive films. The exemplary tablet may also comprise a concurrently capacitive touchscreen which uses finger tip detection, and is capable of detecting the size of the touched area and the relative pressure force used.

Creating and Using a Signature Pathway Passcode

Figure 1:
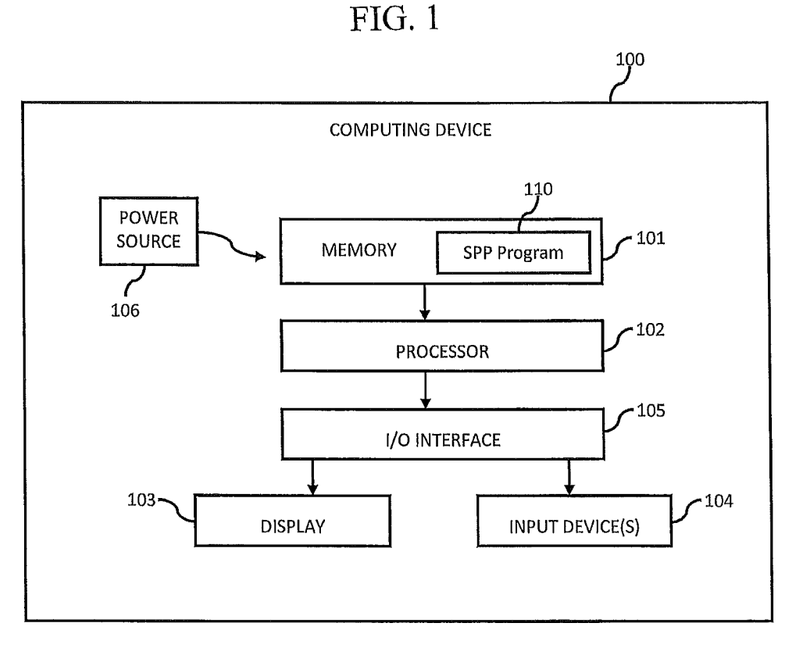
FIG. 1 is a block diagram of an exemplary computing device applicable for implementing a security system and method for Signature Pathway authentication and authorization.

Referring now specifically to the drawings, FIG. 1 is a block diagram of an exemplary computing device 100, such as the tablet discussed above. Computing device 100 is controlled by programs which are stored in RAM, internal nonvolatile memory (e.g., ROM, PROM), and optionally, removable flash and SIM cards (collectively, "memory" 101). The memory 101 also holds relevant program data. Processor 102 employs processing logic to execute the programs. As is conventional with many similar systems, computing device 100 includes a visual display 103 and one or more input devices 104 (such as a keyboard, mouse, pen tablet, and the like) that interact with the processor 102 through an input and output (I/O) interface 105. Display 103 may be a touch-sensitive or multi-touch capable display screen, and may itself function as an input device. Computing device 100 is powered by an internal, external or otherwise connected power source 106.

The exemplary computing device 100 employs program instructions, processing logic, and data stored in memory 101 to implement the present system and method for user authentication and identification via Signature Pathway passcode. The program instructions (software and firmware) for creating and using the Signature Pathway passcode are referred to generally below as "SPP Program" 110. Operation and functionality of the SPP Program 110 for new and returning users (i.e., subsequent entries) is represented in FIGS. 2 and 3, respectively.

Figure 2:
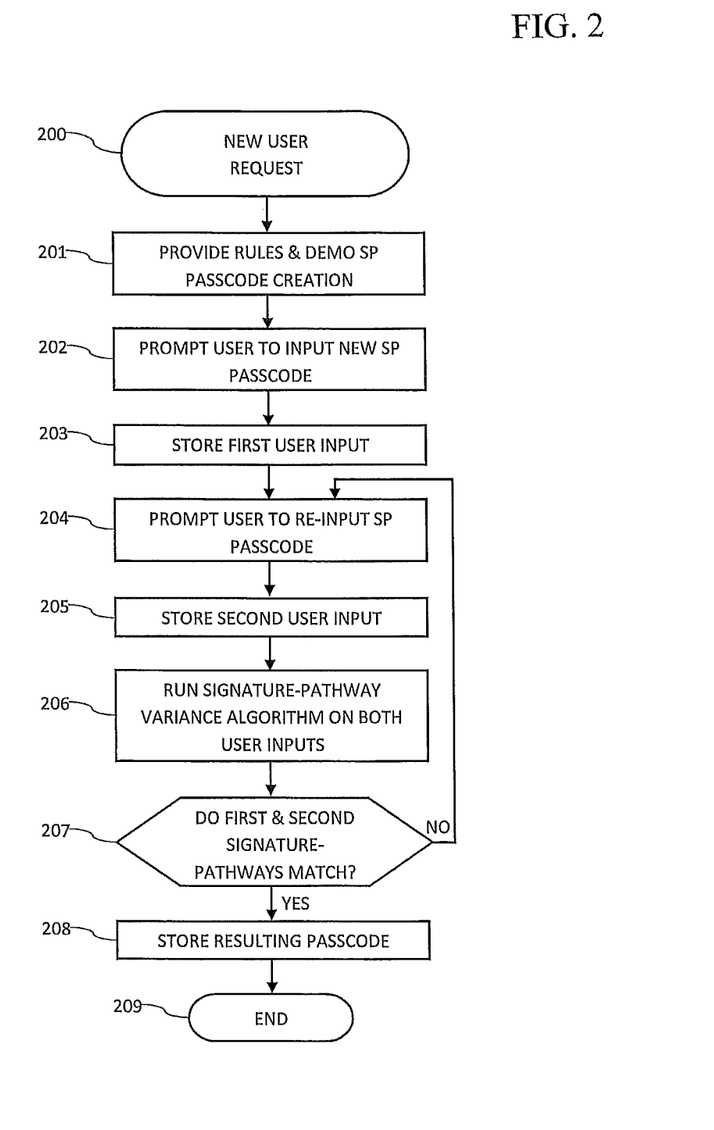
FIG. 2 is a flow diagram showing processing steps for a signature pathway authentication request made within the system of FIG. 1 by a new user (or initial entry)

Referring to FIG. 2, to establish a new Signature Pathway passcode via SPP Program 110 a "New User" request is made at 200, and the user is given certain rules and instructions on touchscreen display 103 with a demonstration of a sample Signature Pathway passcode input, at step 201. The user is then presented with a Graphical User Interface (GUI), an example of which is illustratively shown in FIGS. 4 and 5, and is prompted at 202 to input a new Signature Pathway passcode of the user's choice, according to the rules and instructions provided in step 201. The resulting Signature Pathway passcode is stored in memory 101, at step 203. The user is then prompted to re-input their Signature Pathway passcode, at step 204, and this second input is stored in memory 101, at step 205.

Following step 205, a Signature Pathway Variance Algorithm is called, at step 206, which compares the second (or any subsequent) user input from step 205 to the first user input from step 203. The Variance Algorithm, described further below, checks for a sequence match at step 207 in order to validate the Signature Pathway passcode. If a positive sequence match is not found, then the user is returned to step 204, and is prompted to re-input their Signature Pathway sequence. If a positive sequence match is identified, the SPP Program then calculates an initial Signature Pathway Sequence Average and stores it in memory 101, at step 208, and then ends its execution, at step 209.

Figure 3:
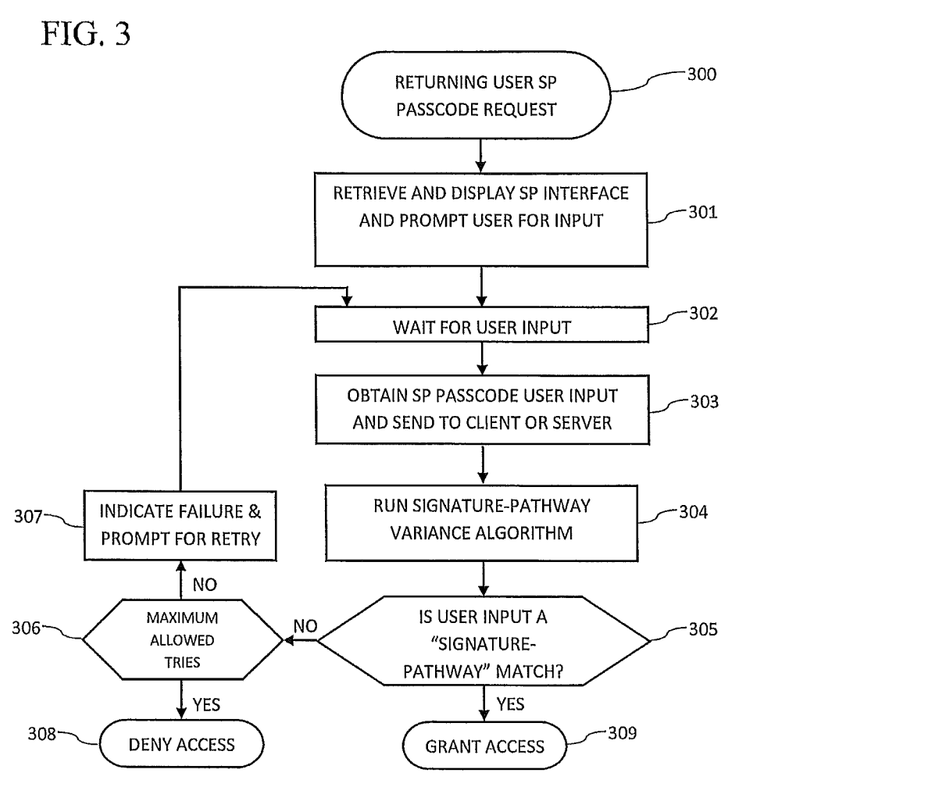
FIG. 3 is a flow diagram showing processing steps for a signature pathway authentication request made within the system of FIG. 1 by a returning user (or subsequent entry)
Figure 4:
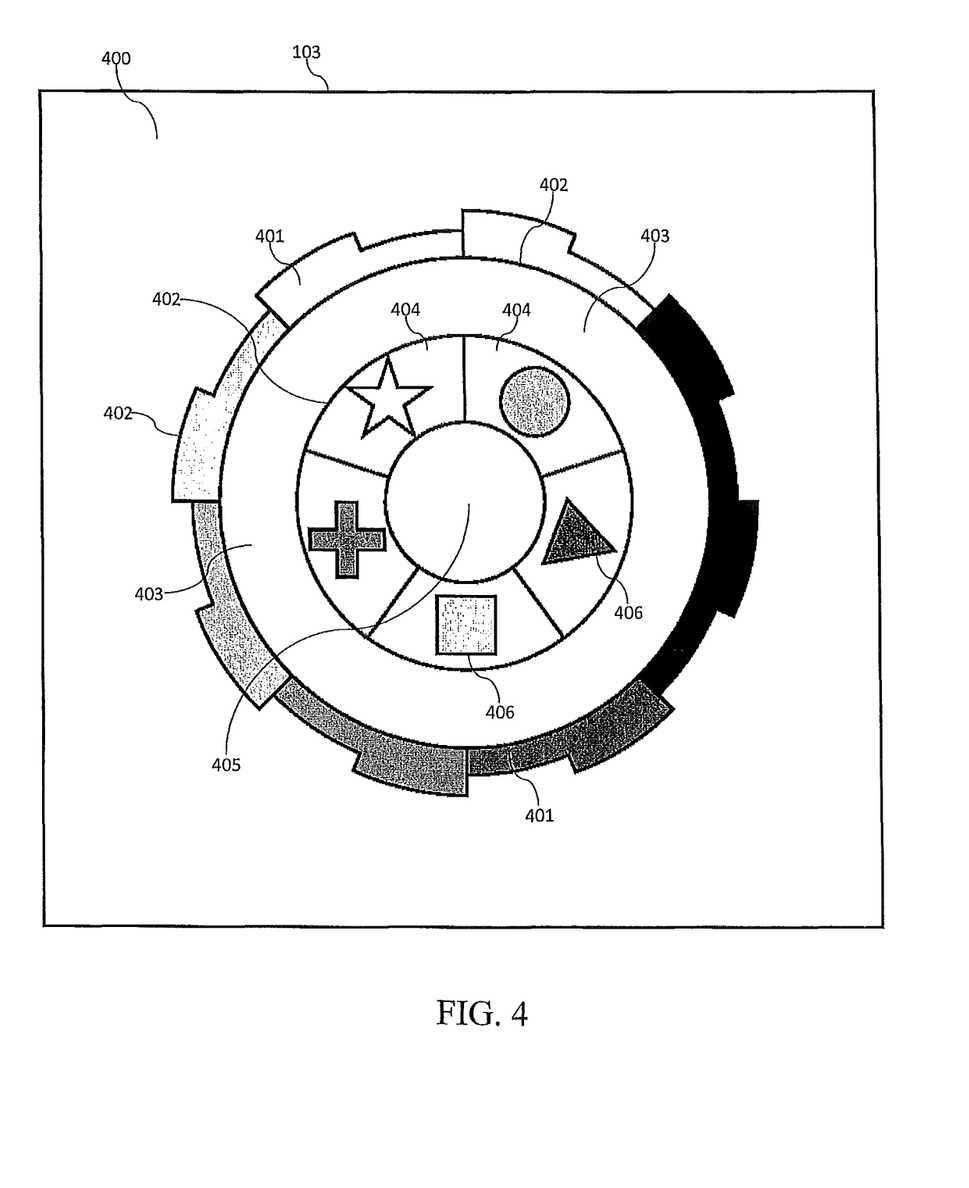
FIG. 4 illustrates one example of a Graphical User Interface applicable in the present security system and method for Signature Pathway authentication and authorization.

Referring to FIGS. 1 and 3, for returning users (i.e., subsequent entries of the Signature Pathway passcode), a "Returning User" request is made at 300 and the Graphical User Interface shown in FIG. 4 is presented to the user on display 103 (FIG. 1). The user is prompted to input his or her Signature Pathway passcode at step 301 using touchscreen display 103 or other input device 104. The SPP Program 110 awaits the user's input at step 302. Upon receiving the user's Signature Pathway passcode, the SPP Program 110 stores the input in memory 101 at step 303. The Signature Pathway Variance Algorithm is then executed, at step 304, comparing the Signature Pathway Sequence Average previously stored in memory 101, at step 209, to the new input received at step 303.

If it is determined at step 305 that a correctly sequenced Signature Pathway match has not been made, then the SPP Program 110 checks at step 306 to see if the maximum number of allowed tries has been reached. Illustratively, only three tries are allowed. If the maximum number of tries has not been reached, the SPP Program 110 indicates the failed entry and prompts the user to try again, at step 307. The SPP Program 110 then returns to step 302 to wait for subsequent Signature Pathway input. However, if it is determined at step 306 that the maximum number of tries has been exhausted, the SPP Program 110 denies the user access to the "secured location" (as defined above) via computing device 100 and ends its execution, at step 308. If it is determined at step 305 that a correctly sequenced Signature Pathway match has been made, the SPP Program 110 grants the user access to the secured location via computing device 100 and ends its execution, at step 309.

Referring to FIGS. 1, 4, and 5, to execute a Signature Pathway passcode (or sequence), in this example, the user begins by placing input device 104 (e.g., finger if using a touchscreen display) within any part of a Start-Finish Zone 400 in the Graphical User Interface, as seen in FIG. 4, and passes through any adjoining Outer Graphical Zone 401 by crossing opposing boundary lines 402. Now, with input device 104 in Outer Passing Zone 403, the user passes input device 104 through two or more unique Inner Graphical Zones 404 by crossing opposing boundary lines 402, and passing through Inner Passing Zone 405. In this example, any number of ongoing passes through the same Inner Graphical Zones 404 are allowed, and the user may additionally choose to pass through any number of different Inner Graphical Zones 404 any number of times. Also, in this illustrative example, each Outer Graphical Zone and Inner Graphical Zone can be uniquely identified by a graphical element 406 or property it possesses, such as a shape, color, image, photograph, video, scent, illustration, sound, or the like.

Upon completion of the Inner Graphical Zone 404 sequence, the user completes execution of the Signature Pathway passcode by passing one final time through Outer Passing Zone 403, and exiting via any single adjoining Outer Graphical Zone 401, and finally returning input device 104 into Start-Finish Zone 400 in the Graphical User Interface, signifying completion. One possible example of a signature pathway execution is illustratively shown in FIG. 5.

Variance Algorithm

Referring to FIGS. 1 through 5, once captured by input device 104 (e.g., finger in the case of a touchscreen display), a Signature Pathway passcode 500 is analyzed by the Signature Pathway Variance Algorithm, at steps 206 and 304 (FIGS. 2 and 3, respectively). The Variance Algorithm function to identify and compare one or more unique characteristics or properties (i.e., "pathway variables") of the Signature Pathway passcode. These pathway variables can be assigned numeric values, and those values can be stored in memory 101 and used to calculate a running average of all Signature Pathway inputs by a given user over time When a returning user inputs their Signature Pathway passcode 500, this input is analyzed by the Variance Algorithm, at step 304 (FIG. 3). The Variance Algorithm determines if each pathway variable falls within an allowable variance range. Algorithmic pathway variables may include, for example, input speed or time, relative input speed or time (represented by arrows 501), Outer Passing Zone direction (e.g., clockwise or counterclockwise—see path at 502), boundary entrance and exit positions and angles (e.g., 503), directional change radii (e.g., 504), and other factors such as touchscreen display pressure, surface area contact size, and physical location of the computing device 100.

As discussed above, the exemplary Graphical User Interface contains a static or dynamic arrangement of unique Graphical Zones. The boundaries of these Graphical Zones may include or may be defined by one or more boundary lines or borders. The outermost and each subsequent interior border are defined by a mathematical equation (or vector). The unique graphical representations or defining elements contained within a particular Graphical Zone may include, for example, various colors, shapes, images, photographs, video clips, animations and other various user-defined elements.

The Graphical User Interface may be paired with a tracking grid or matrix, which is comprised of a series of data points, positions, or zones that are used to track the user's input on the touchscreen display. This tracking grid may be used in conjunction with or independent of the Graphical Zones arrangement.

To authenticate, the user directs his or her input device (mouse, pen, finger or fingers, styles, glove, finger guard, virtual simulated finger, or the like) over and about the Graphical User Interface, creating a "free form" Signature Pathway passcode. The user may also direct their input device through a particular series of Graphical Zones according to a pre-defined sequence. As the user passes their input device through one Zone and onto the next, a Signature Pathway passcode is generated with characteristics unique to the user. This Signature Pathway passcode can then be analyzed by an algorithm capable of making one or more determinations, including: (1) did the user pass through the particular series of graphical shapes according to the correct pre-defined sequence, and (2) does the unique Signature Pathway passcode generated by the user fall within the pre-determined allowable variance of a particular set of pathway variables. The Signature Pathway passcode may comprise a single, substantially continuous, free-flowing motion through Graphical Zones (i.e., with the input device contacting the touchscreen display from start to finish), or a sequence of input "touches" on selected Graphical Zones, or a combination of continuous motion and touch inputs.

A further exemplary embodiment of a signature pathway GUI on touchscreen display 103 is illustrated in FIG. 6. The visual boundaries of the GUI are aligned with and synced to the mathematical boundaries of a Tracking Grid 601 with Tracking Zones 602 (or positions) within the Grid 601. Tracking Grid 601 is not visible to the user. In this embodiment, reference numeral 603 represents an overlapping (or intersecting) point of Signature Pathway passcode 600 entered via input device 104 (e.g., finger of the user) on touchscreen display 103. This point 603 is made possible by the Variance Algorithm discussed below, and an ability of the SPP Program 110 to track each point "crossed" on the GUI at any given time. Thus, even overlapping or intersecting points may be uniquely added to the Signature Pathway passcode 600 (or "data set"). Additionally, this provides the user with the ability to input an entirely free form Signature Pathway. Exemplary Graphical Zones, such as previously described, may be defined in the GUI at 604. In this exemplary embodiment, the user's input device 104 may start within, pass through and end within any portion of any Graphical Zone contained within the GUI. Reference numeral 605 represents the starting point of the Signature Pathway passcode illustrated.

Figure 7:
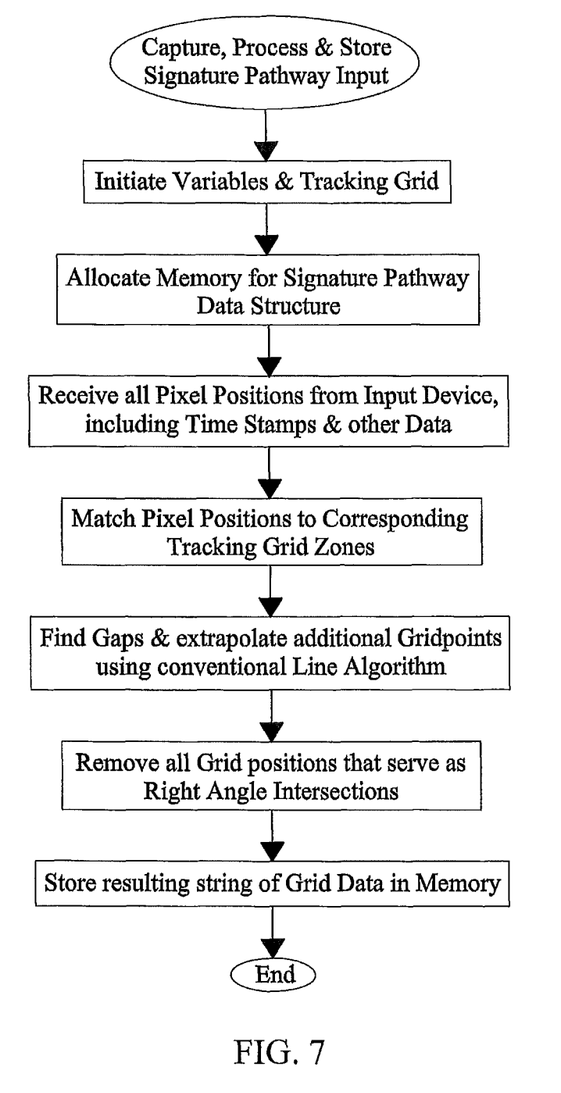
FIGS. 7 and 8 are flow diagrams illustrating use and operation of a Variance Algorithm in the present security system and method for Signature Pathway authentication and authorization.
Figure 8:
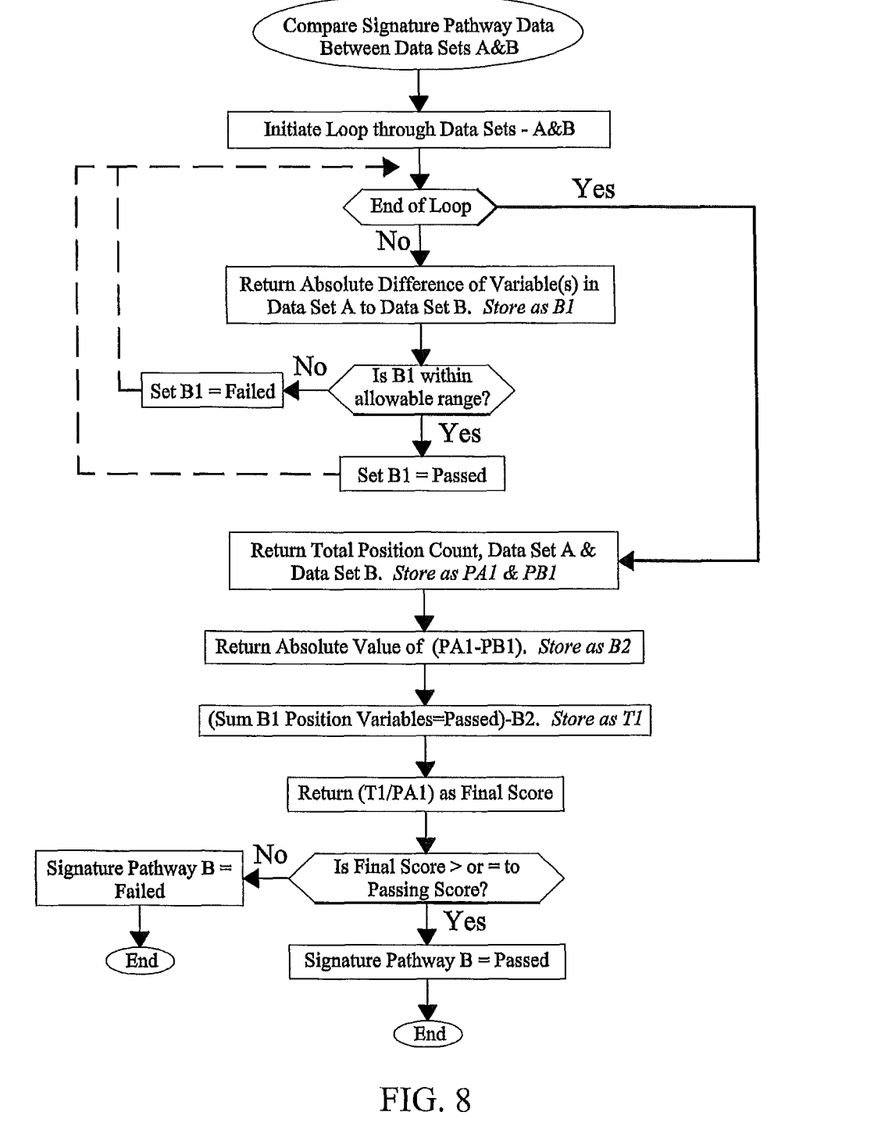

Referring to FIGS. 7 and 8, the exemplary Variance Algorithm may function in multiple stages. In a first stage, the SPP Program captures, processes and stores the data that represents all aspects of a particular user's Signature Pathway passcode. First, all variables that will be used to store a user's Signature Pathway data string (that represent the data structure) on the computing device are initialized. This data structure may include the following variables: 1) the length of the Signature Pathway passcode, which could be represented as a partial or total time value; 2) the number of points that define the size of both the X and Y axis of a grid structure; 3) the location of the input device at any given moment, which could be mapped to and represented by zones or positions contained within the X, Y grid, where each zone or position is defined mathematically as location-X, location-Y and a timestamp in milliseconds; and/or 4) the size or total of all recorded grid points; and/or 5) the physical location of the computing device (via, e.g., A-GPS). An appropriate amount of memory is allocated for said data structure.

As the user moves the input device over the Graphical User Interface, each pixel or position that can be tracked by the device as a result of said movement, at any given moment, is mapped to a position on the X, Y grid. Mapping is accomplished by matching each pixel's position to a corresponding zone contained within the tracking grid. In cases where the input device moves so quickly that the processing system of the device is not able to keep up, and where it could be said that there are large gaps of grid information, other standard line algorithms can be used to extrapolate a series of additional grid points that would likely have been recorded, if the input device had been moved more slowly. An example of a suitable line algorithm could be the Bresenham Line Algorithm. In cases where a sequence of recorded grid positions form a perfect right angle, the grid position contained at the right angle's point of intersection can be removed, as it could be identified as an extraneous position. After all processing of the Signature Pathway data is complete, the resulting string of grid data, inclusive of position, time and all other variables, is stored in the memory of the computing device.

In a second stage of the Variance Algorithm, the SPP Program grades or scores the user's Signature Pathway passcode relative to a previously stored entry. The SPP Program compares the value of each stored variable between the two Pathways, the previously stored Pathway represented here as Data Set A, and the Pathway that was captured in the aforementioned first stage of the SPP Program, represented here as Data Set B. For the purpose of this example, grid position data will be compared.

To begin, a loop that parses through both sets of Signature Pathway data, from Data Set A and B, is initialized. Data values are checked in order to determine if the end of said loop has been reached. Next, the Algorithm returns the measurable difference between values from each data set; In this example, the absolute difference between grid positions from A and B is calculated and stored as B1. If the absolute value of B1 falls within the allowed range, then the condition of B1 is set to "PASSED". If the absolute value of B1 falls outside the allowed range, the condition is set to "FAILED". Similar calculations can be used to compare the stored time values associated with each grid position, both the individual time values and/or the total time value, such that the value or values must fall within a certain allowable range, which could be calculated as an absolute percentage of the original time value or values. If the time value or values fall within the predefined range, the condition of that grid position's time value is set to "PASSED"—otherwise it is set to "FAIL" When the end of the loop has been reached, the loop is exited and a total count of the position data from Data Set A and B is returned and stored as PA1 and PB1, respectively.

Next, the Variance Algorithm returns the absolute value of the difference between PA1 and PB1 and stores the resulting value as B2. A total count of all B1 position variables that have a condition equal to "PASSED" is reduced by B2 and the resulting value is stored as T1. It could be said that the value of T1 represents an adjusted B1 value, effectively reduced by the difference in total size, or length between the two Signature Pathways position count data. T1 is then divided by PA1 and the resulting percentage value is stored as Final Score. If Final Score is greater than or equal to a certain predefined value percentage, Passing Score, as required by a particular system or application, and given that Passing Score's percentage represents the minimum requirement of a successful match, then a positive authentication response is returned for the Signature Pathway represented by Data Set B, and the user is granted access to the secured location. Otherwise, if Final Score is less than Passing Score, a negative authentication response is returned, and the user is denied access to the secured location.

In addition to the above, the SPP Program may also utilize other algorithms for analyzing an ongoing aggregate or average of pathway variables and data points, over time. This would additionally enhance the level of security by dynamically decreasing or "tightening" the allowable variance as the user continues to authenticate using the same Signature Pathway passcode. Over time, the signature motion or pathway of a particular user's passcode may become progressively refined (through muscle memory), and more like the last. The SPP Program may also include the use of configurable Variance settings, in such a way that the algorithm would allow for pathway evolution. By changing the amount of allowable variance of each pathway variable (or all variables), a user could "gently" adjust their passcode over the course of several days or months.

As follows from the discussion above, users may custom-create any number of Signature Pathway passcodes having a desired heightened or reduced level of security. For example, in applications where the level of required security is low, and the requirement for fast entry is high, the user may decide to authenticate using a very simple passcode or pathway sequence. For high security applications, a Graphical User Interface with large numbers of unique Graphical Zones could be used, and the pathway or sequence chosen by the user could be much longer or more complex.

Additionally, Signature Pathway passcodes could be required in tandem by the user, thereby increasing the number of possibilities. Also, unlike traditional alpha-numeric authentication, where the types of characters available for input are limited to the conventional keyboard, the present Signature Pathway passcode may be customized by the user to include any number of passes over a particular Graphical Zone in the Graphical User Interface, or it may be configured so that a user is able to decide the length of time it takes to complete their passcode, or it may be configured so that a passcode has no maximum length; only a recommended maximum length and a minimum length of only a millisecond, for example. Additionally, the pathway that a user chooses to take as they pass through a particular unique Graphical Zone or from one Graphical Zone to the next, can be entirely free-form (i.e., like cursive script) and may appear however the user chooses, only limited by the user's creativity and imagination.

Multi-User Web Browser

In one exemplary implementation, the present disclosure comprises a multi-user web browser which allows for multiple, individual users to create and securely access their own profile using the Signature Pathway concept in order to gain access to the profile, as both the means of identification and authentication. The exemplary software application employs the use of a sign-in screen. This screen displays a Graphical User Interface, along with several navigational buttons, which may include, for example: 1) A GUEST button, to allow the user to simply use the app to browse the web as a guest; 2) A NEW button, to allow the user to create his or her own, unique and secure application profile and setup/create his or her Signature Pathway as described below; and 3) A HELP button, that allows the user to select his or her profile and send a reset code to an e-mail address assigned to the profile. The exemplary HELP button also allows the user to enter his or her access code, giving the user the ability to reset the Signature Pathway, if forgotten. The HELP button may also presents the user with other buttons that link to support materials, accessible through the application.

The secure profile allows users to store all of their bookmarks, web history and cache. When a user visits and signs into a secure site, such as a banking or social networking site, the application may prompt the user to save an "AUTO-PASS" bookmark for that particular site that includes the URL of the sign-in page, along with the username and password entered by the user. From then forward, the user may simply select that bookmark to sign into the site. There is no longer a requirement to manually input the username and password each time the user desires to access that same site in the future. Instead, when the user selects an AUTO-PASS bookmark, the application programmatically enters the previously stored username and password into the appropriate fields contained on the site, and submits the sign-in request button.

The exemplary browser application may also contain more conventional browser features, such as a URL input field, navigational buttons, including forward, back, refresh and stop. Other exemplary features include URL history and URL history suggestions during input; full screen option, which allows the user to hide all navigational bars and elements, in order to use the entire screen for the purpose of viewing a web site; a lock button feature, which gives the user one-touch access to securely close and lock the active user's browser profile, and returns the user to the application's sign-in screen; and bookmark functionality, which includes the ability to save standard bookmarks including the URL and website name. The user may also edit bookmark names or choose to delete bookmarks.

Additional preferences that may be turned on or off by the user, include (e.g.): 1) Auto Full-Screen, which when turned on, automatically sends the application into full-screen mode when a new URL or bookmark is requested or selected; 2) Auto-Lock, which when turned on, automatically locks the screen, returning the user to the sign-in screen, any time that the application is minimized or hidden; 3) Auto-Pass, which when turned on, automatically prompts the user to create a bookmark that will store their username and password, and allow them to automatically sign in to that website in the future.

There may also be an option for users to delete or remove their account, and all associated information, from the application. Additionally, the user is provided with the option to name his or her profile, and store an email address, which can be used to send the user a reset code, in the event the user forgets, or for some other reason, become unable to successfully enter or reproduce his or her Signature Pathway sequence.

An additional feature of the application may include parental controls, where the parent is able to create a master user profile, which can then create other sub-profiles for children and other users. These sub-profiles can be assigned certain permissions, and preferences, whereby the user may only access certain controls, features, or websites from within their profile. Websites that may be accessed could be defined as preselected list, configured by the master user, or could be pulled from another remote server, on which other lists of age appropriate websites are stored and able to be accessed or customized.

OTHER EXEMPLARY EMBODIMENTS, FEATURES, AND IMPLEMENTATIONS

In addition to the above, the exemplary SPP Program, system or method may also include the use of accelerometers and various three-dimensional (3-D) capable displays that employ the use of digital cameras and/or other sensors that track a user's input device (hand or hands, wand, controller, etc.) as it moves throughout each of the spatial planes, X, Y and Z. This 3-D signature-pathway GUI would extend the number of unique Graphical Zones that could be passed through in sequence, effectively increasing the number of Signature Pathway authentication possibilities. The 3-D GUI may be manipulated (turned or rotated) by various interactive movements and gestures of the input device, so that different collections of unique Graphical Zones (or Interface Reference Maps) contained on different layers or surfaces are revealed and become accessible as interactive or static visual references. A three-dimensional interaction method could also allow for the capture of additional variables, as simulated through the use of the Z plane. For example, a predominantly two-dimensional GUI could track the amount of pressure or force exerted on the interface, by allowing the user to "push" into the Z plane, and delivering real time visual feedback that shows the user how much pressure was applied.

The exemplary SPP Program, system or method may also include use of other conventional buttons or keys available on the given computing device that may be depressed for a certain amount of time before, during, or after the Signature Pathway execution to provide an additional element of hard-to-see input (to combat "shoulder-surfing" in more public places).

The exemplary SPP Program, system or method may also include advanced GUI customization options where the user can make adjustments to the size, shape and/or position of any Graphical Zone, or modifications to the color, image, photograph or other graphical representation or otherwise defining element, in whole or in part, that composes, defines or takes up the space within or around a particular unique Graphical Zone. Additional customization options may include, for example, advanced rules that define the ways in which a particular Graphical Zone may be passed through (i.e. entirely or partially), which boundaries of a particular Graphical Zone may be crossed, how much time the user may spend within a particular Graphical Zone, how many concurrent points of input are allowed or required and the maximum, minimum, or exact number of unique Graphical Zones that must be crossed in totality during the execution of that particular user's Signature Pathway passcode.

The exemplary SPP Program, system or method may also include user-configurable zones or sections, contained within the Graphical User Interface, such that the user may identify a particular section of the interface that will always trigger a "negative" authentication response, when crossed, passed over, or otherwise entered. To identify such a space, the user may create a series of points, which define the intersections of a series of lines, which serve to enclose the defined negative space. In another example, the user would simply draw a free-form, closed path, that surrounded and identified the section of the Graphical User Interface which would then trigger a "FAILED" response, when entered.

The exemplary SPP Program, system or method may also include the use of GPS, A-GPS, GPS/times/time zones Comparison during operation and other location tracking technologies, such as those used on mobile and other computing devices, to alter certain features that may include, for example, automatically enabling certain Passtouch security preferences, or raising or lowering the levels of allowable variance for certain variables across all or some data points and/or Graphical Zones, as may be desirable to achieve a certain level of security for a particular location or group of locations, for example.

The exemplary SPP Program, system or method may also include the use of advanced screen input properties, such as the amount of force or pressure exerted on the screen at any given moment, and may incorporate those advanced properties as pathway variables into the Variance Algorithm(s). Other advanced properties of a computing device may include, for example, the ability of the device to capture and approximate the size of the user's input device. For example, a touch screen may be capable of tracking a large collection of points or pixels that represent the complete surface area that the input device is in contact with at any given moment. This collection of points could be analyzed, scored and compared against future entries, in order to obtain a positive match. Using this technique, and/or a similar screen technology, it would also be possible to incorporate the measurement of a user's entire hand, for example. In this way, hand size, finger length, finger length ratios and other physical properties of the user's hand(s) could be incorporated as scored values (i.e., pathway variable) into the Variance Algorithm(s), and could be used as a part of a Signature Pathway, or as a preliminary identifying step to the Signature Pathway identification and authentication process.

The exemplary SPP Program, system or method may also include the use of dynamic, visual and audible feedback as the user creates and/or inputs their Signature Pathway passcode. Examples may include: musical notes, sounds, music or sound effects that are dynamically played in real time as the user passes over certain Graphical Zones, effectively creating audible and distinct "sound signatures" for a given Signature Pathway. These sound signatures could serve as means to improve retention for the average user, or as means to assist visually impaired users. For example, musical notes or tones may be played continuously as the user passes the input device over the Graphical User Interface, such that a higher note or pitch can be heard as the user moves more quickly, and where that same note slides to a lower note or pitch that is heard as the user moves more slowly. Alternatively, or in addition, a visual path or line may be drawn (visible to the user in real time) as the user moves the input device across the Graphical User Interface, and where such a line is consistently the same width, or of varying width, where the width changes depending on the speed or variable rate at which the line is drawn or created. For example, a thicker line is drawn as the speed of input is slower and a thinner line is drawn as the speed becomes faster. This visible pathway line may be drawn at the time the Signature Pathway passcode is created, at the time of authentication, or both; and may remain visible for various amounts of time following the completion of the input, depending on the need or application.

In other embodiments, when inputting a Signature Pathway passcode visual changes may be made to the Graphical Zones or certain parts of the Graphical User Interface, such that as the user passes over, across, near or through a particular portion of the Graphical User Interface, that particular element, or a portion thereof, is affected with a certain visible change, including for example a change in color, tone, brightness, or other visual effect.

The exemplary SPP Program, system or method may also include the use of pseudo-paths to combat shoulder-surfing and to enhance the level of security when authentication is required in a more public setting. In this embodiment, the user may add any path of their choosing to either the beginning of their Signature Pathway, to the end, or both. One example of a requirement for this to work is that the user must pass on/over/through the starting point of the user's real Signature Pathway on the same or similar trajectory as is shared by the beginning of their actual Signature Pathway. The Variance Algorithm could adjust the "PASS/FAIL" scoring value of this "trajectory" requirement dynamically, such that a longer, more complex Signature Pathway entry would have a lower scoring requirement, and a very short and simple entry would require a much higher trajectory score.

The exemplary SPP Program, system or method may also incorporate the use of hardware keys to increase the level of security. In one example, a user would be able to link their Signature Pathway to a specific, physical device. That device would contain an encrypted, unique identifier or hardware ID (e.g., IMEI). The user could then configure the Signature Pathway settings, so that a positive authentication or identification response would only be returned if the hardware key were physically present, and in some way connected to or present on the computing device from which the user had input their Signature Pathway passcode.

The exemplary SPP Program, system or method may also incorporate the use of more conventional biometric technologies. One example of an exemplary integration would involve a touchscreen device, whereby a fingerprint reading could be captured from a specialized area or areas on the screen, or any location on the screen. In this way, a user's fingerprint could be captured and analyzed, either prior to, simultaneously with, or after the input of the Signature Pathway passcode, creating a multi-factor approach with a very high level of security and authenticity. A Signature Pathway entry could also be paired with a retinal scan or voice recognition as another example of a combined, biometric approach.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. A computer-implemented security method for signature pathway authentication and identification, said method comprising:

utilizing a computing device comprising a display screen, a computer-readable storage medium storing computer-executable instructions, a processor for executing the computer-executable instructions, and a graphical user interface enabling user interaction with the computing device, the graphical user interface defined by electronic data points and comprising a visual arrangement of multiple graphical zones on the display screen, and the graphical zones comprising an outer start-finish zone, an annular outer graphical zone directly adjacent the start-finish zone and defined by opposing spaced boundary lines, an annular outer passing zone directly adjacent the outer graphical zone and defined by opposing spaced boundary lines, an annular inner graphical zone directly adjacent the outer passing zone and defined by opposing spaced boundary lines, and an annular innermost passing zone directly adjacent the inner graphical zone and centrally located within the visual arrangement of multiple graphical zones;

utilizing the graphical user interface of the computing device, establishing a user-defined cognitive signature pathway through the electronic data points, the cognitive signature pathway comprising an uninterrupted screen-engaging movement from the outer start-finish zone, across opposing boundary lines of the outer graphical zone, across opposing boundary lines of the outer passing zone, across opposing boundary lines of inner graphical zone, through the innermost passing zone, and from the innermost passing zone, back across opposing boundary lines of the inner graphical zone, back across opposing boundary lines of the outer passing zone, back across opposing boundary lines of the outer graphical zone, and back to the outer start-finish zone to complete the cognitive signature pathway the signature pathway enabling authorized user access to an otherwise secured location, whereby the uninterrupted screen-engaging movement from the outer start-finish zone to the innermost passing zone and back to the outer start-finish zone signifies completion of the user-defined signature pathway, and wherein establishing the user-defined signature pathway comprises inputting the signature pathway using touchscreen technology;

validating subsequent entries of the signature pathway entered via the graphical user interface, wherein validating subsequent entries of the signature pathway comprises utilizing a variance algorithm to determine whether a subsequent entry is within a predetermined allowable variance of the signature pathway, the variance algorithm comprising a data structure incorporating a group of variables including: (i) a length of the signature pathway comprising a time value; (ii) a number of electronic data points that define a size of an X and Y axis of a grid structure; (iii) an electronic location of an input device at any given moment, the location being defined as location-X, location-Y and a timestamp; (iv) a total of all recorded electronic data points in the signature pathway; and (v) a physical location of the computing device when entering the signature pathway, as determined by a Global Positioning System;

adjusting the predetermined allowable variance to adjust a level of security of the computer-implemented security method; and for all valid entries of the signature pathway, allowing user access to the secured location.

2. The computer-implemented security method according to claim 1, wherein the uninterrupted screen-engaging movement is performed manually using a finger of the user.

3. The computer-implemented security method according to claim 1, wherein the uninterrupted screen-engaging movement is performed using an input device selected from a group consisting of a mouse, stylus, joystick, game controller, finger guard, and virtual simulated finger.

4. The computer-implemented security method according to claim 1, and comprising adjusting the predetermined allowable variance to control a relative security of the signature pathway.

5. The computer-implemented security method according to claim 1, and comprising determining a location of the user prior to the user completing a subsequent entry of the signature pathway.

6. The computer-implemented security method according to claim 1, wherein the user-defined signature pathway incorporates user data selected from a group consisting of finger measurements, screen pressure, input speed, and input time.

7. A computer-implemented security system for signature pathway authentication and identification, said security system comprising:

a computing device comprising a display screen, a non-transient computer-readable storage medium storing computer-executable instructions, a processor for executing the computer-executable instructions, and a graphical user interface enabling user interaction with the computing device, the graphical user interface defined by electronic data points and comprising a visual arrangement of multiple graphical zones on the display screen, and the graphical zones comprising an outer start-finish zone, an annular outer graphical zone directly adjacent the start-finish zone and defined by opposing spaced boundary lines, an annular outer passing zone directly adjacent the outer graphical zone and defined by opposing spaced boundary lines, an annular inner graphical zone directly adjacent the outer passing zone and defined by opposing spaced boundary lines, and an annular innermost passing zone directly adjacent the inner graphical zone and centrally located within the visual arrangement of multiple graphical zones;

means which utilizes the graphical user interface of the computing device for establishing a user-defined cognitive signature pathway through said electronic data points, said cognitive signature pathway comprising an uninterrupted screen-engaging movement from the outer start-finish zone, across opposing boundary lines of the outer graphical zone, across opposing boundary lines of the outer passing zone, across opposing boundary lines of the inner graphical zone, through the innermost passing zone, and from the innermost passing zone, back across opposing boundary lines of the inner graphical zone, back across opposing boundary lines of the outer passing zone, back across opposing boundary lines of the outer graphical zone, and back to the outer start-finish zone to complete the cognitive signature pathway, the signature pathway enabling authorized user access to an otherwise secured location, whereby the uninterrupted screen-engaging movement from the outer start-finish zone to the innermost passing zone and back to the outer start-finish zone signifies completion of the user-defined signature pathway and wherein establishing the user-defined signature pathway comprises inputting the signature pathway using touchscreen technology;

means for validating subsequent entries of said signature pathway entered via said graphical user interface, whereby only valid pathway entries gain access to the secured location, wherein said means for validating subsequent entries utilizes a variance algorithm to determine whether a subsequent entry is within a predetermined allowable variance of the signature pathway, the variance algorithm comprising a data structure incorporating a group of variables including: (i) a length of the signature pathway comprising a time value; (ii) a number of electronic data points that define a size of an X and Y axis of a grid structure; (iii) an electronic location of an input device at any given moment, the location being defined as location-X, location-Y and a timestamp; (iv) a total of all recorded electronic data points in the signature pathway; and (v) a physical location of the computing device when entering the signature pathway, as determined by a Global Positioning System; and means for adjusting the predetermined allowable variance to adjust a level of security of the computer-implemented security method.

8. The computer-implemented security system according to claim 7, wherein said means which utilizes the graphical user interface of the computing device for establishing the user-defined signature pathway comprises an input device selected from a group consisting of a mouse, stylus, joystick, game controller, finger guard, and virtual simulated finger.

9. The computer-implemented security system according to claim 7, and comprising means for determining a location of the user prior to the user completing a subsequent entry of the signature pathway.

10. The computer-implemented security system according to claim 7, wherein said means for validating subsequent entries of the signature pathway comprises means for analyzing user data selected from a group consisting of finger measurements, screen pressure, input speed, and input time.

11. The computer-implemented security system according to claim 7, and comprising means denying entry of subsequent signature pathways after a predetermined number of successive failed entries.

* * * * *